United States Patent [19]
Gordini et al.

[11] 3,770,252
[45] Nov. 6, 1973

[54] APPARATUS FOR TREATING VISCOUS LIQUIDS

[75] Inventors: Silvano Gordini; Sergio Noé, both of San Donato Milanese, Italy

[73] Assignee: Snam Progetti S.p.A., Milan, Italy

[22] Filed: June 19, 1970

[21] Appl. No.: 47,783

[52] U.S. Cl.................. 259/107, 165/94, 165/109
[51] Int. Cl.............................................. B01f 7/16
[58] Field of Search.................. 259/107, 108, 7, 259/8, DIG. 18, 23, 24, 43, 44; 23/252; 165/109, 94

[56] References Cited
UNITED STATES PATENTS

| | | | |
|---|---|---|---|
| 2,467,492 | 4/1949 | Olson | 259/108 |
| 2,929,107 | 3/1960 | Andrew | 259/7 |
| 2,914,385 | 11/1959 | Massey | 259/7 |
| 747,645 | 12/1903 | Sachse | 165/94 |

*Primary Examiner*—Robert W. Jenkins
*Attorney*—Ralph M. Watson

[57] ABSTRACT

Apparatus is disclosed for subjecting viscous material to a mixing and heat exchange treatment, as in the polymerization of olefins, which consists of a jacketed vertical reaction vessel having horizontal baffles dividing the vessel into zones and providing heat exchange surfaces which are swept by scraping blades supported on arms fixed to a shaft mounted for rotary movement along the axis of the reaction vessel to clean the viscous material from the heat exchange surfaces.

4 Claims, 6 Drawing Figures

APPARATUS FOR TREATING VISCOUS LIQUIDS

This invention relates to an apparatus suitable for operations aiming to subject viscous materials to heat exchange and mixing.

In chemical industry, processes of such kind are, for instance, those necessary for the production of polymers in solution, soaps, greases and paints.

In such processes the very high and anomalous viscosity of the reaction mixtures makes difficult heat transfer and the mixing of the fluids. The need of transferring heat and homogenizing the reaction mass is particularly important in polymerization processes, where the reaction heat must be swiftly carried off and the reaction mass continuously mixed, and specially when the viscosity of the reaction mass acquires very high values.

Typical polymerization reactions are the ones presented by olefins and/or diolefins to produce very high molecular weight homopolymers or copolymers, according to the known processes of mass polymerization or polymerization in solution.

The above mentioned reactions require uniform and steady operating conditions so as to obtain uniform physical and chemical characteristics of the polymer.

It is therefore necessary that an efficient mixing and the removal of the generated heat be provided for.

In fact it is known that polymers and other viscous liquids tend to foul heat exchange surfaces, reducing the heat exchange coefficients to very low values.

In the prior, art processes and apparatuses are known for exchanging heat in the case of viscous solutions by means of scraped heat exchange surfaces, so that high heat exchange coefficients are obtained by removing the layer adhering to the walls and by bringing new fluid in contact with them continuously.

Apparatuses allowing heat exchange are known, particularly in the form of vertical concentric cylindrical chambers which have the disadvantage of having no large heat exchange surfaces.

We have found a new and improved apparatus suitable for carrying out polymerizations or more general chemical reactions of high viscosity reactants, which apparatus allows high mixing rates and heat exchange efficiencies, without the above mentioned drawbacks.

Though the apparatus according to the present invention is useful for chemical reactions of any kind, we simply refer hereinafter only to reactions of polymerization in solution, said reactions being the ones of the greatest interest.

The apparatus according to this invention comprises a vertical cylindrical vessel with a jacket and horizontal heat exchange surfaces which allow the vessel to be divided in several zones, crossed in series by the reaction mixture.

The horizontal heat exchange surfaces and the jacket are scraped by means of rotating members having scraping blades, which allow the fluid, in contact with the wall, to be removed and changed; in such a way the homogenizing of the reaction solution can be carried out in any reaction zone.

The apparatus of this invention will be described with reference to the enclosed drawing which has the purpose of illustrating the invention only by way of example, and wherein.

Figure 1:
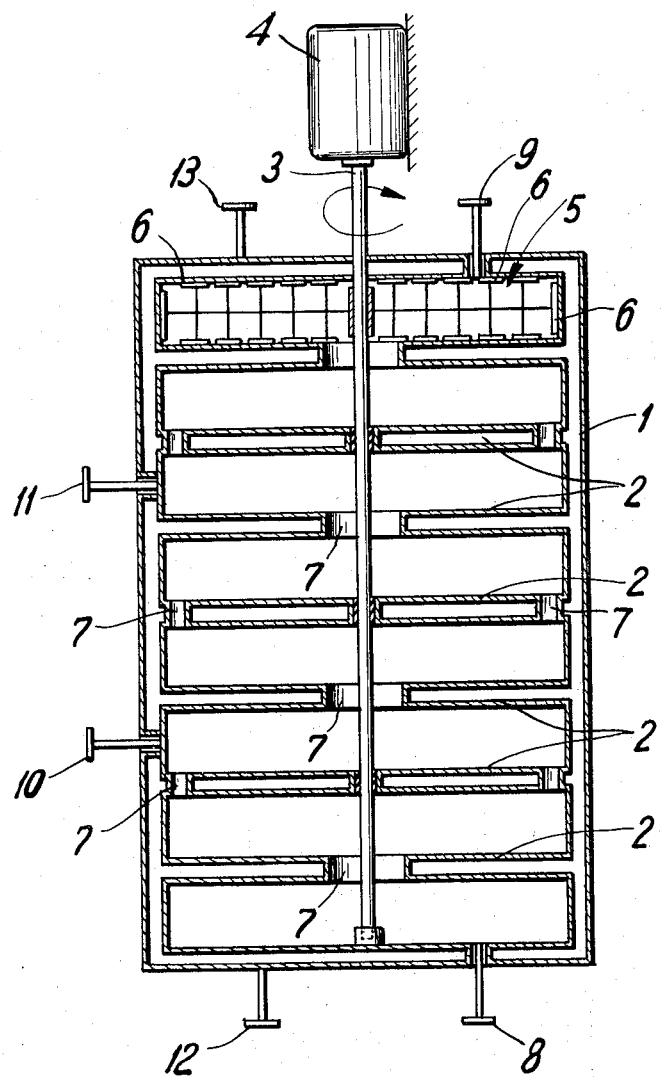
FIG. 1 is a longitudinal section of the apparatus.

More particularly in the FIG. 1:

1. indicates the external envelope having means for the circulation of heat exchange mediums;
2. indicates the separating baffles having means for the circulation of heat exchange mediums;
3. is the rotating shaft driven by motor 4.

The scraping systems 5 are fastened to the shaft 3; said scraping systems are in practice a series of blades supporting arms, of which only one is shown in figures, said scraping systems being provided with blades 6. The separating baffles are provided with openings 7 which do not lie on the same vertical line so as to have a longer fluid flow path inside the vessel.

Along the vertical shaft, in the points where said shaft touches the baffles, the seal is ensured by appropriate means, not shown in the figure, but well known to the skilled in the art. 8 and 9 finally indicate fluid inlet and outlet ports and 10 and 11 indicate side inlet and outlet ports of the apparatus; 12 and 13 indicate ports for the heat exchange fluid.

Figure 2:
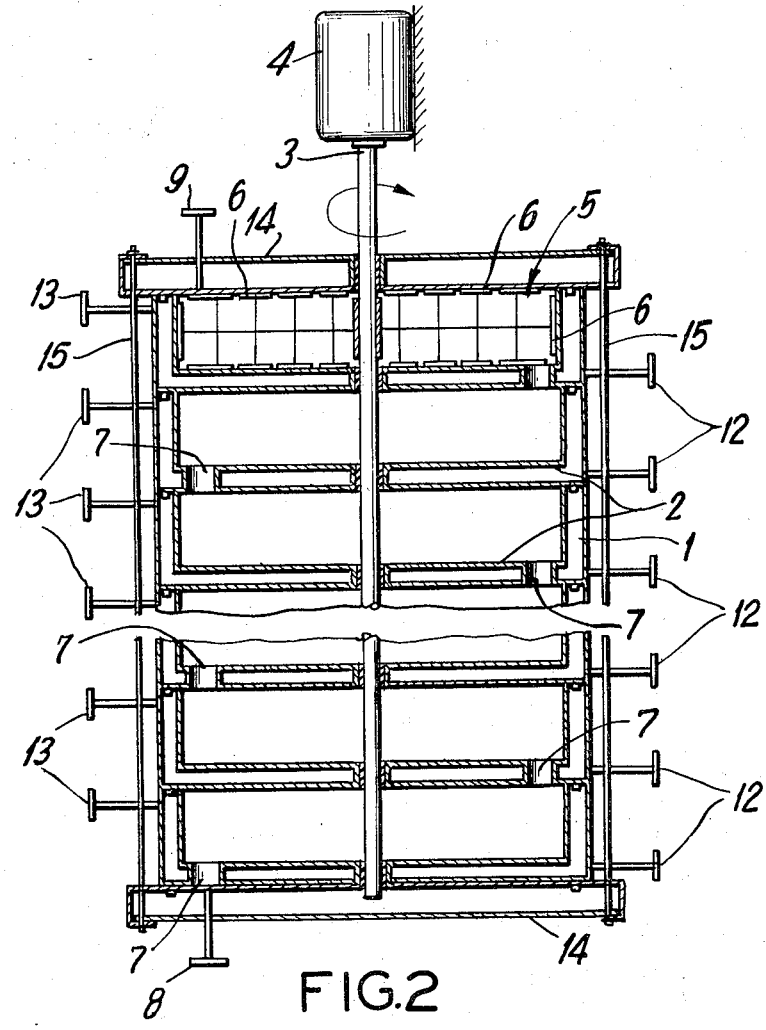
FIG. 2 is a longitudinal section of a further embodiment of the apparatus according to the invention.

FIG. 2 (where reference numerals correspond to those of FIG. 1) represents another embodiment of the apparatus according to the invention; said apparatus comprises many superposed separate sectors where by means of the side ports it is possible to have and to keep different thermal levels in the different sectors constituting the apparatus.

Said different sectors are held firmly together by means of terminal plates 14 and stay-rods 15.

The above mentioned realizations are simplified schemes which may logically be integrated with other elements known to the skilled in the art; in fact it is possible to mount on the blades supporting arms, which are located in all reaction zones and are fastened to the rotating shaft, other elements facilitating the mixing and the flow of the reaction solution in the preferred direction; it is also possible to have a different mixing rate, in the various reaction sectors.

Figure 3A:
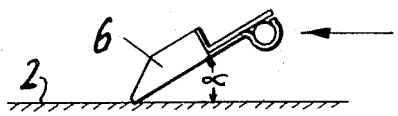
FIGS. 3a to 5 show some realizations of scraping blades; the arrows show the motion direction.

FIG. 3a shows a scraping blade useful for scraping the upper side of the horizontal surfaces of the baffles; the scraping is favoured by the pressure exerted by the liquid on the blades and by the weight of the scraping blades.

Figure 3B:
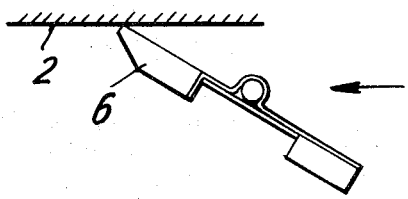

FIG. 3b represents a scraping blade for the lower surfaces of the separating baffles; the scraping is favoured by a counterweight and by the pressure exerted by the liquid on the blades.

Figure 4:
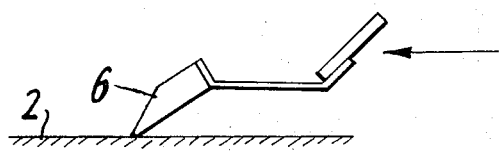
Figure 5:
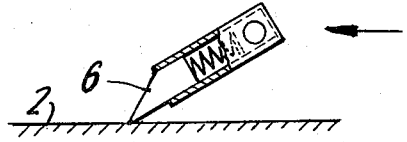

FIGS. 4 and 5 represent other realizations of scraping blades where said scraping action is favoured by means of some elastic systems like springs, which ensure said scraping action.

The advantages obtained by means of the apparatus according to the invention are very good either from a chemical or a technological point of view in particular in the case of polymerization reactions. From the chemical point of view the advantages obtained by means of the apparatus according to the invention, when used as a chemical reactor, are connected to the realization of more than one stage of reaction in a single apparatus.

The reaction volume necessary to carry out a given conversion is considerably reduced as regards the single stage reactor of the same potentiality.

As regards the single stage reactor the power consumption in the mixing is considerably reduced, since in the single stage reactor the polymer concentration along the reactor is almost like the one at the outlet port and therefore the power consumption in the mixing is that corresponding to the highest viscosity.

In the reactor according to the invention the above said highest viscosity is present only in the last reaction zone and decreases in the direction opposite to the reaction mass flow.

It should be finally noted that the power consumption for the correct mixing of more than one partial zone is smaller than the power consumption for homogenizing a single volume resulting from the sum of the volumes of the various zones.

It is very interesting to note that when the apparatus according to the invention is used as a polymerization reactor, the zone, in which a greater amount of heat is generated, is the one where the polymer concentration is lower, namely the one which needs lower power for mixing and where the heat exchange is more efficient.

The polymerization reactions in fact have a reaction rate proportional to the monomer concentration and the polymeric solutions have heat exchange coefficients which decrease as concentration of the polymer increases. Another considerable advantage from a chemical point of view is the fact that the particular disposition of the reaction zones we have in the apparatus according to the invention limits the possibility of by-passing and allows a distribution of the permanence time quite like the one of plug flow and in such a way that back-mixing is prevented.

Owing to the particular running of the apparatus according to the invention it is possible, by introduction or withdrawal at intermediate points along the apparatus, to carry out precise interventions in well defined and intermediate points of the vessel so as to influence the course of the process which occurs in the vessel itself.

From a technological point of view one of the more important advantages of the apparatus according to the invention is its structure and its maintenance. Since the basic element repeats the apparatus may be made according to the previously illustrated scheme of FIG. 2. Further owing to this fact, it is possible to effect a remarkable saving in the apparatus construction.

The construction of reactors having a different number of sectors and therefore different reaction volumes, requires only a shaft of different length, the remaining sectors having the same shape and size. Like advantages are found in the maintenance during the working. If we consider the running of the apparatus according to the invention, when used as a heat exchanger having scraped surfaces, it should be noted that the whole volume is utilized for housing the heat exchange surfaces obtaining in this way, if necessary, high exchange surface/volume ratios.

Another remarkable advantage is connected with the fact that, in the different heat exchanging sectors, fluids of different characteristics either in composition or in thermal level can be used for the heat exchange. The heat exchange may also be controlled by the mixing rate. At last since the heat exchange surfaces are mostly horizontal the scraping action is favoured with respect to apparatuses having vertical surfaces to be scraped.

Devices used to ensure the contact of the scraping blades with the heat exchange surfaces are simple to be realized and some of them are described only by way of unrestrictive examples in FIGS. 3a to 5.

More particularly the scheme shown in FIGS. 3a and 3b is based on the following running principle.

Also when the shaft is motionless the gravity force keeps in contact the scraping members. When the shaft is in motion the opposing force exerted by the fluid makes the blades adhere still better to the wall. Since for exploiting such effect when the motion begins, it is necessary that the mixed fluid exerts a pressure on the blades the value of angle $\alpha$ lies between 0° and 90°.

A different solution may be the one shown in FIG. 4, where the blades are kept in contact with the scraped surfaces not only by the pressure effect but also by an elastic element, like an external spring. Said solutions present with regard to the preceding one, the advantage of making no use of hinges or joints, which may be blocked by sticky foulings.

A characteristic of the scheme shown in FIG. 5 is the independence of the force pressing on the walls from the pressure exerted by the fluid on the blades.

Said solutions are mentioned only by way of unrestrictive examples and have the purpose of making clear the fact that the preservation of the contact between blades and walls can be realized exploiting the action of gravity, of the pressure exerted by the fluid on the blades and of internal or external elastic elements.

The following example illustrates the application of the apparatus according to the invention to the isoprene polymerization reaction.

EXAMPLE 240 kg/h of a solution of isoprene and polyisoprene in hexane, coming from a preceding reactor, are continuously fed to a reactor like the one shown in FIG. 1 having 190 litres capacity and 3 m$^2$ heat exchange surface.

The content of polyisoprene in the above solution entering the reactor is 10 percent.

A isoprene polymerization reaction occurs inside the reactor so that the polyisoprene concentration in the solution coming out is increased to 15 percent.

In said conditions the solution viscosity is 800.00 cP, when the velocity gradient is 1 sec$^{-1}$.

The amount of polyisoprene produced into the reactor is 12 kg/h and, being the polymerization heat 250 kcal per kg of produced polyisoprene, the heat generated during the reaction is 3,000 kcal/h.

The solution temperature is kept at 25°C by heat exchange with water having a temperature of 17°C at the inlet and a temperature of 19°C at the outlet.

In such conditions the heat exchange coefficient results to be 143 kcal/h m$^2$ °C, not considering the heat generated during the mixing.

What we claim is:

1. Apparatus suitable to perform operations by means of which viscous materials are subjected to heat exchange and mixed, said apparatus consisting in a vertical cylindrical vessel, a jacket surrounding said vessel, hollow horizontal baffles providing upper and lower heat exchange surfaces which separate said vessel into more than one zone, said hollow horizontal baffles being provided with openings which do not lie on the same vertical line so as to allow the viscous mass inside the apparatus to follow a tortuous path, a rotatable shaft mounted substantially along the axis of the apparatus, arms fastened to said shaft, and scraping blades supported by said arms adapted to clean said upper and lower heat exchange surfaces of viscous material.

2. Apparatus as claimed in claim 1 where the baffles have openings placed alternately at the periphery and at the axial center of the apparatus.

3. Apparatus as claimed in claim 1 where the baffles have openings placed at the periphery in alternately opposed positions.

4. Apparatus suitable to perform operations by means of which viscous materials are subjected to heat exchange and mixed, said apparatus consisting in a vertical cylindrical vessel, a jacket surrounding said vessel, hollow horizontal baffles providing upper and lower heat exchange surfaces which separate said vessel into more than one zone, said hollow horizontal baffles being provided with means for supplying different heat exchange liquids thereto at a selected temperature, a rotatable shaft mounted substantially along the axis of the apparatus, arms fastened to said shaft, and scraping blades supported by said arms adapted to clean said upper and lower heat exchange surfaces of viscous material.

* * * * *